US007015990B2

(12) United States Patent
Yeh et al.

(10) Patent No.: US 7,015,990 B2
(45) Date of Patent: Mar. 21, 2006

(54) LIQUID CRYSTAL DISPLAY INCLUDING O-TYPE AND E-TYPE POLARIZER

(75) Inventors: Pochi Yeh, Thousand Oaks, CA (US); Alla Y. Sakharova, Belmont, CA (US); Yuri A. Bobrov, Moscow (RU)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/240,531

(22) PCT Filed: Apr. 24, 2001

(86) PCT No.: PCT/US01/13189

§ 371 (c)(1),
(2), (4) Date: Apr. 14, 2003

(87) PCT Pub. No.: WO01/81991

PCT Pub. Date: Nov. 1, 2001

(65) Prior Publication Data

US 2004/0105049 A1 Jun. 3, 2004

(30) Foreign Application Priority Data

Apr. 24, 2000 (RU) ............................. 2000110172

(51) Int. Cl.
*G02F 1/1335* (2006.01)

(52) U.S. Cl. ....................................................... 349/96

(58) Field of Classification Search ................... 349/96
See application file for complete search history.

(56) References Cited

U.S. PATENT DOCUMENTS 3,941,901 A 3/1976 Harsch
4,230,768 A 10/1980 Hamada et al.
4,545,648 A 10/1985 Shulman et al.
4,818,624 A 4/1989 Downey, Jr.
4,895,769 A 1/1990 Land et al.
5,007,942 A 4/1991 Claussen et al.
5,619,352 A 4/1997 Koch et al.
5,676,880 A 10/1997 Beresnev et al.
5,686,979 A * 11/1997 Weber et al. ................. 349/96
5,739,296 A 4/1998 Gvon et al.

(Continued)

FOREIGN PATENT DOCUMENTS

EP 0 503 834 A2 9/1992

(Continued)

OTHER PUBLICATIONS

Hiyashi, N. et al., "6.2: A High-Performance Novel Polarizer Based on Dyestuff", Sumitomo Chemical Co., Ltd., Ehime, Japan, 1998, 4 pages.

(Continued)

*Primary Examiner*—Tarifur R. Chowdhury
(74) *Attorney, Agent, or Firm*—Dorsey & Whitney LLP

(57) ABSTRACT

The disclosure pertains to the devices of information displays, in particular liquid crystal displays, and could be utilized in indication devices for various purposes. Liquid crystal displays, according to this disclosure, contain at least one layer of liquid crystal placed between two plates, on each plates there has been formed or applied at least one electrode or a system of electrodes, or an active matrix, and at least one layer of polarizer; while at least one polarizing layer is the E-type polarizer and at least one polarizing layer is an O-type polarizer. The polarizer, according to the invention, consists of at least two polarizers, at least one of which is the E-type polarizer and at least one is the O-type polarizer.

16 Claims, 1 Drawing Sheet

U.S. PATENT DOCUMENTS

| | | | | |
|---|---|---|---|---|
| 6,049,428 | A | 4/2000 | Khan et al. | |
| 6,532,051 | B1 * | 3/2003 | Yeoh et al. | 349/113 |

FOREIGN PATENT DOCUMENTS

| | | | |
|---|---|---|---|
| EP | 0 539 847 | A1 | 5/1993 |
| EP | 1 004 921 | A1 | 5/2000 |
| JP | 54-39146 | | 3/1979 |
| JP | 58-6927 | A | 1/1983 |
| JP | 60-17403 | A | 1/1985 |
| JP | 10-48034 | A | 2/1989 |
| JP | 8-511109 | A | 11/1996 |
| JP | 9-197125 | A | 7/1997 |
| JP | 2001-504238 | A | 3/2001 |
| JP | 2001-515945 | A | 9/2001 |
| WO | WO 97/39380 | A1 | 10/1997 |

OTHER PUBLICATIONS

Cobb, Carl et al., "Application Specific Polarizers", *ASIC '00 Proceedings*, Oct. 18-21, 2000, Xi'an, PR China, pp. 475-479.

Bahadur, B., ed., *Liquid Crystals: Applications and Uses*, "Display Parameters and Requirements", World Scientific, 1990, pp. 104, 173, 175, 188.

Bobrov, Y. A., "Dependence of the anisotropic adsorption coefficient on the thickness of molecularly oriented organic dye films", J. Opt. Technol. 66 (6), Jun. 199, pp. 547-549.

Franklin, G., et al., "Evaluation of liquid crystal thin film polarizers coated on the inside and the outside of LCD's", Proceedings of the 3rd International Conference on Coating on Glass, Oct. 29-Nov. 2, 2000, Mastricht, The Netherlands, pp. 641-644.

Jagt, Henri et al., "Linear Polarizers Based on Polymer Blends: Oriented Blends of Poly(Ethylene-2-6-Naphthalenedicarboxylate) and a Poly(Styrene/Methylmethacrylate) Copolymer", Jpn. J. Appl. Phys., vol. 37, Part 1, No. 8, Aug. 1998, pp. 4389-4392.

Land, Edwin H. et al., "Dichroism and Dichroic Polarizers", *Colloid Chemistry*, vol. 6, Jerome Alexander, ed., Van Nostrand Reinhold Co., New York 1946, pp. 160-190.

Lazarev, Pavel et al., "P-116: Thin Crystal Films (TCF) for LCD Contrast Enhancement", SID Digest, Baltimore, May 2003, pp. 669-671.

Palto, S. P. et al., "P-92: Enhanced Viewing Angle Characteristics: Compensated TN Design with E-type Polarizers", SID Digest, Boston, May 2002, pp. 566-569.

Yeh, Pochi et al, *Optics of Liquid Crystal Displays*, 1999, John Wiley & Sons, NY, p. 71.

Yeh, P. et al., "Molecular Crystalline Thin Film E-Polarizer", *Molecular Materials* 14, 2001, pp. 1-19.

* cited by examiner

LIQUID CRYSTAL DISPLAY INCLUDING O-TYPE AND E-TYPE POLARIZER

BACKGROUND

1. Field

The disclosure pertains to the technology of information displays, in particular to the liquid crystal displays (LCD), and could be utilized in devices of various configurations.

2. Description of the Related Art

The following references, which are incorporated by reference are of interest in this disclosure.

1. L. K. Vistrin. GVHO, 1983, vol. XXVII, 2-nd ed., pp. 141–148
2. U.S. Pat. No. 5,007,942, 1991
3. RU 2120651, 1998
4. U.S. Pat. No. 5,739,296, 1998

These references are now further discussed.

There are liquid crystal (LC) displays, which are realized having two parallel flat plates, the inside surfaces of which are coated with patterns of optically transparent conducting material and the alignment layer. After the assembly of the plates the space between them is filled with liquid crystal, which forms a layer 5–20 $\mu$m thick and plays the role of the active medium, which changes its optical qualities (angle of twist of the polarizing plane) under the influence of electric field. The change in the optical qualities is registered in the cross-oriented polarizers, which are usually applied onto the inside surfaces of the plates. Therefore, the areas of the display, on the electrodes of which electrical field is not applied, will look bright (open state), while the areas, the electrodes of which are under the electrical field, will look dark (closed state) (L. K. Vistrin. GVHO, 1983, vol. XXVII, 2-nd ed., pp. 141–148).

The main drawback of the described above displays is the limited viewing angle. This is because the multi-layered structure of the LC display is effectively controlled by the flux of light propagating towards the surface of the display within a limited solid angle, The polarizers in such displays are polymer-based, such as polyvinyl-alcohol, which is made optically anisotropic by uniform stretching of a thin film (U.S. Pat. No 5,007,942, 1991). The optical anisotropy is obtained as a result of ordering of the polymer molecules along the direction of stretching. When exposed to iodine vapor or iodine-containing solution or an organic dye, the film is colored with the intensity of color depending of the direction of the vector of the electric field E in the electromagnetic wave relative to the axis of stretching. Polarizing effectiveness of such films is determined by the concentration of iodine or other organic coloring agent and the degree of ordering of the polymer molecules. Such films feature the so-called positive dielectric anisotropy and positive dichroism. This means that the dipole moments of optical transition of molecules, which are responsible for absorption of light, are oriented along the direction of stretching. At the same time the ellipsoids of the angle dependence of the real and imaginary parts of the refraction coefficient have an extended form. Polarizers obtained from the described above films are termed O-type, since the 'ordinary' wave will pass through, while the 'extraordinary' will not.

Despite the high polarizing effectiveness, these polarizers have substantial drawbacks. These are low light and thermal resistance, large required thickness to achieve high effectiveness. One of the main drawbacks featured by the two cross-oriented polarizers is the high transmission of light incident at an angle (±45) to the surface of the polarizers.

There are LC displays that utilize polarizers on the inside surfaces of the glass plates (RU 2120651, 1998). The polarizers used in such displays are thin films with ordered molecular structure of the liquid crystal polarizer (LCP) (U.S. Pat. No. 5,739,296, 1998). The flat molecules of such LCP are grouped together into the so-called directionally ordered bunches—supramolecular complexes. The planes of the individual molecules, and thus their inherent dipole moments of optical transition, are oriented perpendicular to the axis of macroscopical orientation of the produced film. To create such structure one uses the liquid-crystalline state of the LCP, where the molecules are already ordered locally, while in one- or two-dimensional blocks oriented relative to each other. When applied onto a surface with an additional external alignment force, such substance assumes the macroscopical orientation, which upon dehydrating not only reins but could also improve on its own. The resulting axis of polarization is along the direction of the external aligning action. In this case the ellipsoids of the angle dependence of the real and imaginary parts of the refraction coefficient have disk-like shape, The latter polarizers are termed E-type, since 'extraordinary' wave is now transmitted and 'ordinary' is blocked.

Such polarizer features a number of substantial disadvantages, which limit its applicability. One of those is the insufficient polarizing effectiveness, and some transmission of light has been registered trough two parallel cross-oriented polarizers of this type with the incident unpolarized light at an angle to their surfaces. This effect is especially prominent when at least one of the polarizers has the diffused-reflection coating, which is used in the majority of LC displays.

SUMMARY

The technical results herein are: the improvement of the angle characteristics of polarizers and LC displays, the reduction of the amount of transmitted unpolarized light by a single as well as parallel-coupled polarizers while retaining their thickness, the enhancement of their polarizing effectiveness, improved contract, widening of the viewing angle as well as elimination of the 'gray field' effect during operation.

These technical results are achieved by utilizing combinations of E- and O-type polarizers. Here, the O-type polarizer provides the high transmission of light during open state, while E-type polarizer provides the high angle characteristics in the closed state. The E-type polarizer with the optimal characteristics, which correspond to the high value of the coefficient of absorption along the normal to the plane of the polarizer is obtained by forming a thin film of molecular-oriented LCP (liquid crystal polarizer) on the surface of O-type polarizer. The orientation of the molecules is such that their dipole moments of the optical molecular transit are distributed in the plane perpendicular to the axis of polarization and the surface of O-type polarizer.

The display could be manufactured according to known techniques and could be produced with a known design not to exclude the option to utilize some original, and possibly not yet described methods and arrangement. An aspect of interest in this disclosure from other disclosed prototypes is in the use of a combination of different types of polarizers. The disclosed here polarizer utilizing a composition of at least two layers, one of each is O-polarizer and another is E-polarizer, could be used in any field of technology which quires such characteristics, in particular in the field of liquid crystal displays of different applications.

DRAWINGS

The present disclosure is illustrated in part by the enclosed drawings of which:

DETAILED DESCRIPTION

Envisioned in this disclosure is the following.

Figure 1:
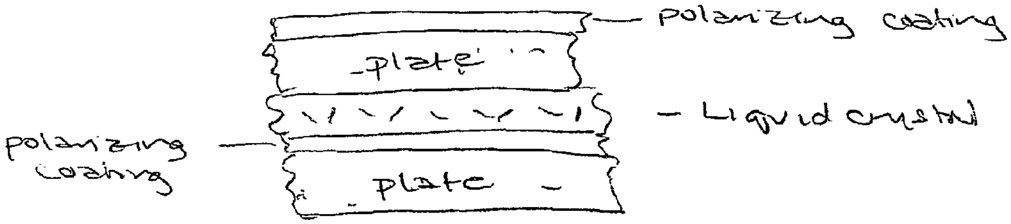
FIG. 1 is a diagrammatic depiction of the first embodiment.

In a first embodiment, as seen in FIG. 1, there is a liquid crystal display containing at least one layer of the liquid crystal placed between two plates. On each plate there is disposed or applied at least one electrode, a system of electrodes, or an active matrix; and at least one layer of polarizer. At least one layer of polarizer is an O-type polarizer and at least one layer of polarizer is an E-type polarizer.

In a display of the first embodiment, the O-type polarizer is preferably an iodine-polyvinyl, iodine-polyvinylene or polyvinylene polarizer. The E-type polarizer is preferably formed as a thin film comprised of a plurality of supramolecular complexes of one or several organic materials, the supramolecular complexes being generally unidirectionally oriented in order to ensure polarization of incident light.

A dichroic polarizer is preferably used as the E-type polarizer, the dichroic polarizer comprising a film of oriented molecules of an organic compound. In this film, the organic compound is such that the main axes of the ellipsoids of the real and imaginary part of the anisotropic refraction coefficient of the compound forming the film is in the range of at least one band of absorption wavelength. The following is true for an area with linear dimensions no less than the wavelength:

$$K_1 \geqq K_2 > K_3$$

and $$\frac{(n_1+n_2)}{2} > n_3$$

where, $K_1$, $K_2$, $K_3$ and $n_1$, $n_2$, $n_3$, are the major or main values of the real and imaginary part, respectively, of the axes of the ellipsoid. In addition or alternatively, the film is characterized by the fact that for two films with crossed polarization axes, the transmission of light does not increase in at least a certain range of wavelengths, when its direction departs, deviates, or deflects from the normal to the polarizer plane. The directions corresponding to the maximum and minimum values of the imaginary part of the refraction coefficient lie in the plane parallel to the plane of the substrate.

The organic compound of which the E-type polarizer is formed, comprises at least one organic substance which includes at least one ionogenic group, which provides solubility in polar and non-polar solvents in order to create the lyotropic liquid-crystal phase and at least one counter-ion, which in the process of formation of the film either remains in the structure of the molecules or does not.

The organic substance comprises at least one organic dye capable of absorption in at least one of the following ranges: from 200 through 400 nm, 400 through 700 nm, or 0.7 through 13 μm. Further, at least one of the polarizers is an internal polarizer and applied on the internal side of one of the glass plates. The layers of the polarizers of O- and E-types are applied to the inside and/or the outside of one plate or inside and/or the outside of both of the plates. Also, the optical axes of polarizers E- and O-types are mutually parallel or mutually perpendicular.

The plates described herein are preferably fabricated out of glass, plastic, semiconductor material, metal or any other material suitable for their manufacture. The plates may all be made of the same materials or different materials. However, at least one of the plates is preferably optically transparent in the working area of light spectrum. The display also has the means of obtaining colored images.

The liquid crystals are comprised of a nematic, smectic, or cholesteric liquid crystals or liquid crystals of any other chemical classes or their mixtures.

The display also contains at least one alignment layer and/or at least one diffuse-reflecting layer and/or at least one phase-shifting layer and/or at least one birefringent layer and/or at least one conducting layer and/or at least one protective layer and/or at least one isotropic layer and/or at least one anisotropic layer and/or at least one insulating layer and/or at least one alignment layer and/or at least one diffuse- or mirror-reflecting layer and/or a layer simultaneously functioning as at least two of the above layers.

In this disclosure, the E-type polarizer may also function as a phase-shifting layer, and/or birefringent layer, and/or alignment layer, and/or protective layer, and/or a layer functioning as at least two of the foregoing layers.

The device also includes spacers on at least one of the plates to limit the distance of separation between the plates.

The display is of either the transmissive or reflective type.

Figure 2:
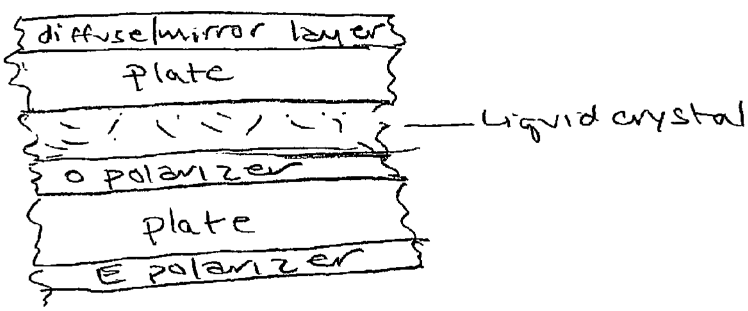
FIG. 2 is a diagrammatic depiction of the second embodiment.

In a second embodiment as seen in FIG. 2, the display contains at least one layer of liquid crystal placed between two plates. On each plate, there has been disposed or formed at least one electrode or a system of electrodes, or an active matrix, wherein on one of the plates there has been disposed a diffuse- or mirror-reflecting layer, and on one of the plates there has been disposed at least one layer of an O-type polarizer and at least one layer of an E-type polarizer.

In this second embodiment the layers of polarizers of O- and E-type are applied to different sides of a plate. In this instance, the O-type polarizer is formed using iodine-polyvinyl, iodine-polyvinylene or polyvinylene polarizer, and the E-type polarizer comprises a thin film comprised of a plurality of supramolecular complexes of one or several organic compounds, wherein the supramolecular complexes are unidirectionally oriented in order to polarize the incident light.

A dichroic polarizer is preferably used as the E-type polarizer, the dichroic polarizer comprising a film of oriented molecules of an organic compound. In this film, the organic compound is such that the main axes of the ellipsoids of the real and imaginary part of the anisotropic refraction coefficient of the compound forming the film is in the range of at least one band of absorption wavelength. The following is true for an area with the linear dimensions no less than the wavelength:

$$K_1 \geqq K_2 > K_3$$

and $$\frac{(n_1+n_2)}{2} > n_3$$

where, $K_1$, $K_2$, $K_3$ and $n_1$, $n_2$, $n_3$, are the major or main values of the real and imaginary part. Accordingly, the axes of the ellipsoid, and/or the film is characterized by the fact that for two films with crossed polarization axes the transmission of light does not increase in at least a certain range of wavelengths when its direction departs, deviates, or deflects from the normal to the polarizer plane.

In this embodiment, the directions which correspond to the maximum and minimum values of the imaginary part of the refraction coefficient lie in the plane parallel to the plane of the substrate. Also, the E-type polarizer comprises at least one organic compound, which comprises at least one ionogenic group, which provides its solubility in polar and non-polar solvents in order to create the lyotropic liquid crystal phase, and at least one counter-ion, which in the process of formation of the film either remains in the structure of the molecule or does not.

This embodiment includes at least one organic dye, capable of absorption in at least one of the following ranges: from 200 through 400 nm, or 400 through 700 nm, or from 0.7 through 13 $\mu$m, used as the organic compound of the polarizer. Further, the plates are fabricated out of glass, plastic, semiconductor, metal or any other material suitable for their manufacture, and in addition, the same or different materials could be used for either of the plates. Also it is preferred that at least one of the plates is optically transparent in the working range of light spectrum.

The display of this embodiment also includes means for obtaining colored image. Further, the embodiment includes liquid crystals comprised of a nematic, smectic or cholesteric liquid crystals, or liquid crystals of any other chemical classes or their mixtures. This second embodiment also includes at least one alignment layer and/or at least one diffuse-reflecting layer, and/or at least one phase-shifting layer, and/or at least one birefringent layer, and/or at least one conducting layer, and/or at least one protective layer, and/or at least one isotropic layer and/or anisotropic layer, and/or at least one insulating layer and/or at least one alignment layer, and/or a layer simultaneously functioning as at least two of the above layers.

The layer of the E-type polarizer in this second embodiment functions simultaneously as a phase-shifting layer, and/or birefringent layer, and/or alignment layer, and/or protective layer, and/or a layer functioning as at least two of the above layers. Also, at least on one of the plates there are the spacers to limit the distance of separation between the plates.

Figure 3:
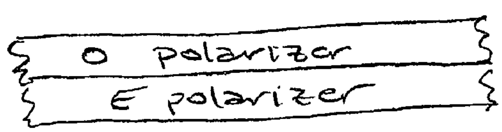
FIG. 3 is a diagrammatic depiction of the third embodiment.

In a third embodiment as seen in FIG. 3, there is a polarizer, comprising at least two layers, at least one of which is an O-type polarizer and at least one of the polarizer layers is an E-type polarizer. In this embodiment, the O-type polarizer is preferably an iodine-polyvinyl, iodine-polyvinylene or polyvinylene polarizer, and the E-type polarizer used is a thin film comprised of a plurality of supramolecular complexes of one or several organic compounds, wherein the supramolecular complexes are unidirectionally oriented in a determined direction in order to polarize the incident light.

The E-type polarizer is a dichroic polarizer. This dichroic polarizer comprises a film of oriented molecules of an organic compound, wherein the main axes of the ellipsoids of the real and imaginary part of an anisotropic refraction coefficient of the compound forming the film is in the range of at least one band of absorption wavelengths. The following is true for an area with the linear dimensions no less than the wavelength:

$$K_1 \geqq K_2 > K_3$$

and $$\frac{(n_1+n_2)}{2} > n_3$$

where, $K_1$, $K_2$, $K_3$ and $n_1$, $n_2$, $n_3$, are the major or main values of the real and imaginary part, respectively, of the axes of the ellipsoid, and/or for two films with crossed polarization axes the transmission of light does not increase in at least a certain range of wavelengths when its direction departs, deviates, deflects from the normal to the polarizer plane.

The E-type polarizer comprises at least one organic compound, which includes at least one ionogenic group, which provides its solubility in polar and non-polar solvents in order to create the lyotropic liquid crystal phase and at least one counter-ion, which in the process of formation of the film either remains in the structure of the molecule or not.

This embodiment includes as the organic compound at least one organic dye, capable of absorption in at least one of the following ranges: from 200 through 400 nm, or 400 through 700 nm, or from 0.7 through 13 $\mu$m. The layer of E-type polarizer is applied on top of the layer of O-type polarizer and/or vice versa. The polarizer is preferably multi-layered with any possible combination of E- and O-type polarizer layers. Preferably, the thickness of each layer is designed to provide polarizing effectiveness of 70 to 100%.

Further, the polarizer may include an additional mirror- or diffuse-reflecting layer applied onto its surface from the side of the E- or O-type polarizer layer or both.

Making use of the methods of assembly of LC displays, one can list a number of various configurations.

Design 1. One of the possible LC display designs could be a transmissive display with internal polarizers. One of the polarizers in such a display design could be the single-layered E-type polarizer manufactured according to the method described in (U.S. Pat. No. 5,739,296, 1998), applied to one of the glass plates (first plate). This polarizer has a crystalline structure of oriented supramolecular complexes of an organic matter, most commonly dyes. Various materials and polarizers of this type are widely known and used (U.S. Pat. No. 5,739,296, 1998). Such polarizer has negative dielectrical anisotropy and negative dichroism; it has inherently high polarizing and operational characteristics. The other polarizer could be formed by application onto another glass plate of display, and it is multi-layered, in particular double-layered. The first of the layers could be, for example, a layer of O-type polarizer, which features positive dielectrical anisotropy and positive dichroism. This layer could be built with the oriented molecules of polyvinyl alcohol colored by iodine. It is possible, for example, to first obtain this polarizer as a thin film and then apply it to the inside of the glass plate, which already has the electrode pattern and the alignment layer applied on it. However; the method of application and arrangement of the components other than the polarizer could vary. On top of the above-mentioned O-type polarizer one could apply a layer of E-type polarizer, either directly on a O-type polarizer layer or on an intermediate layer, which could be isotopic as well as anisotropic. In this example design the E-type polarizer could be utilized also as the alignment layer and/or as the birefringent layer, and/or as the phase-shifting layers. This option in addition to the result achieved by the different designs of the layers in polarizer and a display also allows decreasing the thickness of the display.

The stacking order of O-type and F-type layers, however, could be other than described above, which will not change the resultant characteristics. In particular, the E-type polarizer could be applied onto the display plate where the electrode pattern or an active matrix along with the alignment layer have already been applied, and the O-Type polarizer could be applied on top of that, also by the direct forming of a layer on the surface or by the gluing of a mediator film formed in advance.

The described above double-layered polarizers correspond to the polarizers according to the claims. The mentioned configuration of layers could be changed according to the requirements—it could be higher or could be different The layers of O- and E-type polarizers can alternate as well as double.

In the described display design the first display plate could be made of a single-layered O-type polarizer made out of oriented molecules of polyvinyl-alcohol colored by iodine.

In a different arrangement of a transmissive LCD with internal polarizers, each polarizer plate is made out of the multi-layered polarizers with the same or distinct layering sequence and combination of E- and O-type polarizers.

Design 2. Another configuration of a transmissive LC which can be designed in accordance with the claims of the invention, could be obtained by applying different sequences of polarizers in variable combinations on the outside of the plates. Usually protective coatings fulfil this function for this sort of structures. However, since the invention does not limit the configuration of LC display to any one kind, but characterize the polarizers' structure only, we will not focus on the description of all structures details of the known LCD designs. These include the arrangement of spacers, the method of joining of the display plates, the manufacturing and application of the electrodes and other elements as well as the choice of materials for them, which could be a subject of another invention.

Design 3. A particular attention should be paid to the design of a transmissive LC display with a "mixed" sequencing of polarizing layers. The sequencing could be any of the above-mentioned kinds utilizing different types of polarizers, which could be applied on either side of the plates. The choice could vary for different designs and the sequence is determined by the particular requirements of the intended application. This flexibility of possible combinations and sequencing of polarizer layers allows substantial broadening of functional possibilities of displays.

Design 4. The most promising, according to the obtained results, is the reflective LC display, where one of its sides is non-transparent i.e. a reflecting layer (film or plate) which is mirror-reflecting or diffusive-reflecting in the working display range is placed either at the internal or external rear plate.

The configuration of polarizing layers in the reflective display could be the same as in the case of the transmitting display described above. The difference is in the option to place the polarizer layers on the rear plate side. In case the reflective layer is placed behind the rear plate then the combination of polarizers could be any. In case the reflective layer is placed at the internal side of the rear display plate, or the plate is not transparent itself and it is reflective itself, in this case rear plate polarizers could be internal only.

All the designs of LC displays and the combined polarizer, despite their variety, do not deplete the list of possible arrangements determined by the claims of the disclosed invention. However, according to the experimental results, the use of the described designs with different polarizer sequences and combinations allows substantially enhance technical characteristics of LC displays. Here, all the displays manufactured featured improved angle characteristics of polarizers as well as the display as a whole. The displays exhibited negligible amount of transmitted unpolarized light by a single polarizer as well as by two parallel polarizers. In addition to that, improvements like substantially enhanced polarizing effectiveness and contrast ratio; viewing angle was broadened up to 180° and an absence of the 'gray effect' has been registered. All of the mentioned improvements can be obtained with various assembly designs. This greatly broadens functional possibilities of high quality LC displays and allows unification of the manufacturing process of different displays hence lowering the cost.

The invention claimed is:

1. A liquid crystal display comprising two plates; and at least one layer of the liquid crystal placed between the two plates, wherein on each of the plates there is applied a system of electrodes, and wherein at least one of the two plates has at least two polarizers comprising an O-type polarizer and an E-type polarizer, and the other plate comprises at least one polarizer,.

wherein the E-type polarizer is formed by a dichroic polarizer, which is realized as a film of oriented molecules of an organic matter wherein for the main axes of the ellipsoids of the real and imaginary part of its anisotropic refraction coefficient in the range of at least one band of absorption wavelengths the following is true for an area with the linear dimensions no less than the wavelength:

$$K_1 \geqq K_2 > K_3$$

and $$\frac{(n_1 + n_2)}{2} > n_3$$

where, $K_1$, $K_2$, $K_3$ and $n_1$, $n_2$, $n_3$, are main values of the real and imaginary part, respectively, of the axes of the ellipsoid, and/or the film is characterized by the fact that for two films with crossed polarization axes the transmission of light does not increase for at least a certain range of wavelengths with its direction declined form the normal to the polarizer plane.

2. A liquid crystal display comprising two plates, and at least one layer of the liquid crystal placed between the two plates, wherein on each of the plates there is applied a system of electrodes, and at least one of the two plates has at least two polarizers comprising an O-type polarizer and an E-type polarizer, and the other plate comprises at least one polarizer, wherein the O-type polarizer is applied to outside of the at least one of two plates and the E-type polarizer is applied to inside of the at least one of two plates.

3. The liquid crystal display according to claim 1 or 2 wherein the O-type polarizer is formed with iodine-polyvinyl, iodine-polyvinylene or polyvinylene polarizer, and the E-type polarizer is formed as a thin film comprised of supramolecular complexes of one or several organic matters, supramolecular complexes of which are uniformly oriented in order to polarize light.

4. The liquid crystal display according to claim 1 or 2 wherein the directions corresponding to the maximum and minimum values of the imaginary part of the refraction coefficient lay in the plane parallel to the plane of the plate.

5. The liquid crystal display according to claim 1 or 2 wherein the organic matter of the E-type polarizer is formed with at least one organic matter chemical formula of which features at least one ionogenic group, which provides solubility in polar and non-polar solvents in order to create the lyotropic liquid-crystal phase and at least one counter-ion, which in the process of formation of the film either remains in the structure of the molecules or not.

6. The liquid crystal display according to claim 5 wherein the organic matter is based on at least one organic dye capable of absorption in at least one of the following rages: from 200 through 400 nm, or 400 through 700 nm, or from 0.7 through 13 $\mu$m.

7. The liquid crystal display according to claim 6 wherein at least one of the polarizer is an internal polarizer and applied on the internal side of one of the plates.

8. The liquid crystal display according to claim 1 or 2 wherein the optical axes of the E-type and O-type polarizers are mutually parallel or mutually perpendicular.

9. The liquid crystal display according to claim 1 or 2 wherein the plates are made out of either glass, plastic, semiconductor, metal or any other material used for their manufacturing, and the same or different materials are used for either of the plates.

10. The liquid crystal display according to claim 1 or 2 wherein at least one of the plates is optically transparent in the working range of light spectrum.

11. The liquid crystal display according to claim 1 or 2 further comprising a means of obtaining colored image.

12. The liquid crystal display according to claim 1 or 2 wherein a nematic or smectic or cholesteric or their mixtures is used as the substance of liquid crystal.

13. The liquid crystal display according to claim 1 or 2 further comprising at least one alignment layer and/or at least one diffuse-reflecting layer and/or at least one phase-shifting layer and/or at least one birefringent layer and/or at least one conducting layer and/or at least one protective layer and/or at least one isotropic layer and/or anisotropic layer and/or at least one dielectric layer and/or at least one alignment layer and/or at least one diffuse- or mirror-reflecting layer and/or a layer functioning as at least two of the above layers.

14. The liquid crystal display according to claim 1 or 2 wherein the E-type polarizer is at the same time functioning as a phase-shifting layer, and/or a birefringent layer, and/or an alignment layer, and/or a protective layer, and/or a layer functioning as at least two of the above layers.

15. The liquid crystal display according to claim 1 or 2 wherein at least on one of the plates there are spacers controlling the distance of separation between the plates.

16. The liquid crystal display according to claim 1 or 2 wherein the display is either transmissive or reflective type.

* * * * *